(12) United States Patent
Kang et al.

(10) Patent No.: US 11,964,870 B2
(45) Date of Patent: Apr. 23, 2024

(54) METHOD FOR PREPARING CARBON NANOTUBES

(71) Applicant: LG CHEM, LTD., Seoul (KR)

(72) Inventors: Kyung Yeon Kang, Daejeon (KR); Hyun Joon Kang, Daejeon (KR); Ki Soo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 574 days.

(21) Appl. No.: 17/059,945

(22) PCT Filed: Jul. 22, 2019

(86) PCT No.: PCT/KR2019/009042
§ 371 (c)(1),
(2) Date: Nov. 30, 2020

(87) PCT Pub. No.: WO2020/022725
PCT Pub. Date: Jan. 30, 2020

(65) Prior Publication Data
US 2021/0214227 A1    Jul. 15, 2021

(30) Foreign Application Priority Data

Jul. 27, 2018   (KR) .................. 10-2018-0088008

(51) Int. Cl.
*C01B 32/162*    (2017.01)
*B01J 21/02*     (2006.01)
(Continued)

(52) U.S. Cl.
CPC .......... *C01B 32/162* (2017.08); *B01J 21/02* (2013.01); *B01J 23/22* (2013.01); *B01J 27/25* (2013.01);
(Continued)

(58) Field of Classification Search
CPC .............. C01B 32/162; C01B 2202/32; C01B 2202/36; B01J 21/02; B01J 23/22;
(Continued)

(56) References Cited

U.S. PATENT DOCUMENTS 9,809,458 B2 * 11/2017 Kim .................. B01J 35/0026
2014/0054179 A1    2/2014 Yamamoto et al.
(Continued)

FOREIGN PATENT DOCUMENTS

CN    104870363 A    8/2015
JP    2009078235 A   4/2009
(Continued)

OTHER PUBLICATIONS

Chunye Zhu et al., "Formation of close-packed multi-wall carbon nanotube bundles", Diamond and Related Materials, 2004, vol. 13, No. 1, pp. 180-183, XP004484598.(4 Pages).
(Continued)

*Primary Examiner* — Colin W. Slifka
*Assistant Examiner* — Logan Edward Laclair
(74) *Attorney, Agent, or Firm* — BRYAN CAVE LEIGHTON PAISNER LLP

(57) ABSTRACT

The present invention relates to a method for preparing carbon nanotubes, the method including: preparing a support including AlO(OH) by primary heat treatment of Al(OH)$_3$; preparing an active carrier by supporting a mixture including a main catalyst precursor and a cocatalyst precursor on the support; drying the active carrier through multi-stage drying including vacuum drying; preparing a supported catalyst by secondary heat treatment of the dried active support; and preparing carbon nanotubes in the presence of the supported catalyst, and the carbon nanotubes prepared by the method as described above can remarkably improve conductivity.

12 Claims, 2 Drawing Sheets

(51) Int. Cl.
  *B01J 23/22* (2006.01)
  *B01J 27/25* (2006.01)
  *B01J 31/12* (2006.01)
  *B01J 37/08* (2006.01)

(52) U.S. Cl.
  CPC ............ *B01J 31/122* (2013.01); *B01J 37/08* (2013.01); *C01P 2004/13* (2013.01); *C01P 2004/64* (2013.01); *C01P 2006/12* (2013.01)

(58) Field of Classification Search
  CPC . B01J 27/25; B01J 31/122; B01J 37/08; B01J 21/04; B01J 23/74; B01J 23/8472; B01J 23/8892; B01J 37/0201; B01J 35/1019; B01J 37/0207; B01J 37/0236; C01P 2004/13; C01P 2004/64; C01P 2006/12
  See application file for complete search history.

(56) References Cited

U.S. PATENT DOCUMENTS

| | | |
|---|---|---|
| 2014/0272596 A1 | 9/2014 | Yamamoto et al. |
| 2014/0309105 A1 | 10/2014 | Kang et al. |
| 2015/0238937 A1 | 8/2015 | Kang et al. |
| 2015/0273441 A1 | 10/2015 | Kim et al. |
| 2015/0274529 A1 | 10/2015 | Kim et al. |
| 2015/0298974 A1 | 10/2015 | Kim et al. |
| 2016/0214863 A1 | 7/2016 | Kim et al. |
| 2017/0036914 A1 | 2/2017 | Sohn et al. |
| 2018/0162734 A1 | 6/2018 | Kang et al. |
| 2020/0047164 A1 | 2/2020 | Kang et al. |
| 2021/0214227 A1 | 7/2021 | Kang et al. |

FOREIGN PATENT DOCUMENTS

| | | | |
|---|---|---|---|
| JP | 2012-188476 A | | 10/2012 |
| JP | 2016-502466 A | | 1/2016 |
| JP | 2017-196579 A | | 11/2017 |
| KR | 10-2012-0075760 A | | 7/2012 |
| KR | 10-1431953 B1 | | 8/2014 |
| KR | 20150037661 A | * | 9/2014 |
| KR | 10-20150007266 A | | 1/2015 |
| KR | 2015-0007267 A | | 1/2015 |
| KR | 10-20150037661 A | | 4/2015 |
| KR | 10-1535387 B1 | | 7/2015 |
| KR | 10-20150135090 A | | 12/2015 |
| KR | 10-20150142408 A | | 12/2015 |
| KR | 10-20160114812 A | | 10/2016 |
| KR | 10-20160125030 A | | 10/2016 |
| KR | 10-1785773 B1 | | 10/2017 |
| KR | 2020-0012562 A | | 2/2020 |
| TW | 201422863 A | | 6/2014 |
| TW | 201436346 A | | 9/2014 |

OTHER PUBLICATIONS

Office Action of Japanese Patent Office in Appl'n No. 2020-567519 dated Dec. 13, 2021.

\* cited by examiner

METHOD FOR PREPARING CARBON NANOTUBES

The present application is a National Phase entry pursuant to 35 U.S.C. § 371 of International Application No. PCT/KR2019/009042 filed on Jul. 22, 2019, and claims priority to and the benefit of Korean Patent Application No. 10-2018-0088008, filed on Jul. 27, 2018, which are hereby incorporated by reference in their entirety.

FIELD

The present invention relates to a method for preparing carbon nanotubes, and to a method for preparing carbon nanotubes including drying an active carrier through multi-stage drying including vacuum drying.

BACKGROUND ART

In general, carbon nanotubes refer to cylindrical carbon tubes having a diameter of several nanometers to several tens of nanometers and having a length greater by several times to several ten times than the diameter. These carbon nanotubes consist of layers of aligned carbon atoms.

Carbon nanotubes may be generally prepared by an arc discharge method, a laser evaporation method, a chemical vapor phase synthesis method, or the like. Among these, the arc discharge method and the laser evaporation method have problems in that it is difficult to mass-produce, and the economic efficiency is lowered due to excessive arc production cost and laser equipment purchase cost.

Carbon nanotubes exhibit insulator, conductor or semiconductor properties depending on their unique chirality, and the carbon atoms are connected by strong covalent bonds, and thus the carbon nanotubes have tensile strength greater than steel, superior flexibility and elasticity, and chemical stability.

Such carbon nanotubes can be dispersed in a dispersion medium and used as a conductive material dispersion. When the carbon nanotubes are dispersed at a high concentration in order to improve the conductivity of the conductive material dispersion, it becomes difficult to handle the same due to the increase in viscosity.

Accordingly, research has been continued to improve the conductivity of the conductive material dispersion without increasing the concentration of carbon nanotubes.

(Patent Document 1) KR10-1431953B

SUMMARY

An aspect of the present invention provides a method for preparing carbon nanotubes with significantly improved conductivity.

To solve the abovementioned problems, the present invention provides a method for preparing carbon nanotubes, the method including: preparing a support including AlO(OH) by primary heat treatment of Al(OH)$_3$; preparing an active carrier by supporting a mixture including a main catalyst precursor and a cocatalyst precursor on the support; drying the active carrier through multi-stage drying including vacuum drying; preparing a supported catalyst by secondary heat treatment of the dried active support; and preparing carbon nanotubes in the presence of the supported catalyst.

In addition, the present invention provides carbon nanotubes which are prepared according to the above-described preparing method, and include a carbon nanotube unit having an average diameter of 5-20 nm.

According to a method for preparing carbon nanotubes of the present invention, since carbon nanotube units having a small average diameter can be prepared, the number of carbon nanotube units per unit area is significantly increased.

Since the carbon nanotubes prepared by the method for preparing the carbon nanotubes of the present invention are in a bundle type, the carbon nanotubes may be applied to a conductive material dispersion, and the conductivity of the conductive material dispersion may be significantly improved.

DETAILED DESCRIPTION

Figure 1:
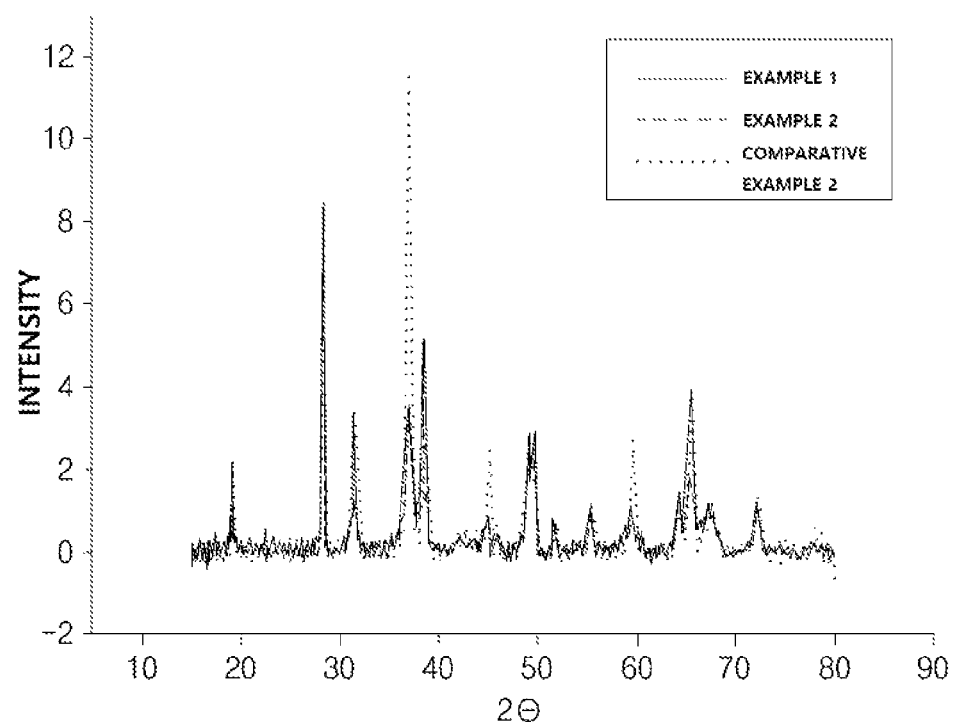
FIG. 1 is the XRD patterns of supported catalysts prepared in Example 1, Example 2, and Comparative Example 2.

Hereinafter, the present invention will be described in more detail to aid in understanding the present invention.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

"Carbon nanotubes" as used herein have a secondary structure shape formed by gathering all or part of carbon nanotube unit cells, and the carbon nanotube unit cell has a graphite sheet having a cylinder shape having a nano size diameter, and sp$^2$ bonding structure. In this case, characteristics of a conductor or a semiconductor may be exhibited depending on the angle and structure in which the graphite sheet is rolled.

Carbon nanotube unit cells can be divided into single-walled carbon nanotubes (SWCNTs), double-walled carbon nanotubes (DWCNTs) and multi-walled carbon nanotubes (MWCNTs), depending on the number of bonds that form the walls. The thinner the wall, the lower the resistance.

The carbon nanotubes of the present invention may include any one or two or more of single-walled, double-walled, and multi-walled carbon nanotube unit cells.

As used herein, unless mentioned otherwise, the term "bundle type" refers to a secondary structure shape in the form of a bundle or a rope, in which a plurality of carbon nanotube unit cells are arranged side by side along the orientation to which the longitudinal axes of the unit cells are substantially identical, or twisted or entangled after being arranged.

As used herein, unless mentioned otherwise, the term "entangled type" may refer to a form in which a plurality of carbon nanotube unit cells are entangled without a constant shape, such as a bundle or a rope shape.

The average particle diameter of the carbon nanotube unit cells herein may be measured using SEM and BET.

The specific surface area of the carbon nanotubes herein may be measured by the BET method. Specifically, the specific surface area can be calculated from the nitrogen gas adsorption amount under the liquid nitrogen temperature (77K) using BELSORP-mini II (product name, manufacturer: BEL Japan, Inc.).

1. Method for Preparing Carbon Nanotubes

A method for preparing carbon nanotubes according to an embodiment of the present invention includes: 1) preparing a support including AlO(OH) by primary heat treatment of Al(OH)$_3$; 2) preparing an active carrier by supporting a mixture including a main catalyst precursor and a cocatalyst precursor on the support; 3) drying the active carrier through multi-stage drying including vacuum drying; 4) preparing a supported catalyst by secondary heat treatment of the dried active support; and 5) preparing carbon nanotubes in the presence of the supported catalyst.

Hereinafter, a method for preparing carbon nanotubes according to an embodiment of the present invention will be described in detail.

Step 1

First, Al(OH)$_3$ is primarily heat-treated to prepare a support including AlO(OH).

When the primary heat treatment is carried out, a support including mesopores which are easy to carry a catalyst is prepared, and in the subsequent process, a main catalyst and a cocatalyst are well dispersed in the support, thereby producing carbon nanotubes having a high specific surface area.

The primary heat treatment may be carried out at 100 to 500° C., and preferably at 200 to 400° C.

If the above conditions are satisfied, it may be prevented that Al(OH)$_3$ is converted to Al$_2$O$_3$ while the support contains 30 wt % or more of AlO(OH) converted from Al(OH)$_3$ with respect to the total weight. This enables the formation of a support capable of producing not entangled carbon nanotubes but only a carbon nanotube bundle.

Step 2

Subsequently, a mixture including a main catalyst precursor and a cocatalyst precursor is supported on the support to prepare an active carrier.

In order to prepare an active carrier in which the main catalyst precursor and the cocatalyst precursor are uniformly supported on the support, the mixture may further include a solvent, and the main catalyst precursor and the cocatalyst precursor may be in a solution state dissolved in a solvent. The solvent may be at least one selected from the group consisting of water, methanol and ethanol, wherein the water is preferred.

The main catalyst may be at least one selected from the group consisting of cobalt, iron, nickel, manganese and chromium, wherein the cobalt is preferred.

The main catalyst precursor may be at least one selected from the group consisting of nitrates, sulfates, carbonates and acetates of the main catalyst, wherein the nitrate of the main catalyst is preferred.

The main catalyst precursor may be at least one selected from the group consisting of (NO$_3$)$_2$, Co(NO$_3$)$_2$.6H$_2$O, Co$_2$(CO)$_8$, Co$_2$(CO)$_6$[HC≡C(C(CH$_3$)$_3$)], Co(CH$_3$CO$_2$)$_2$, Fe(NO$_3$)$_3$, Fe(NO$_3$)$_2$.nH$_2$O, Fe(CH$_3$CO$_2$)$_2$, Ni(NO$_3$)$_2$, Ni(NO$_3$)$_2$.6H$_2$O, Mn(NO$_3$)$_2$, Mn(NO$_3$)$_2$.6H$_2$O, Mn(CH$_3$CO$_2$)$_2$·n(H$_2$O), and Mn(CO)$_5$Br, wherein at least one selected from the group consisting of Co(NO$_3$)$_2$.6H$_2$O, Fe(NO$_3$)$_2$·nH$_2$O, and Ni(NO$_3$)$_2$·6H$_2$O is preferred.

The cocatalyst improves dispersibility of the main catalyst, may be vanadium, and may be vanadium and molybdenum.

The cocatalyst precursor may be at least one selected from the group consisting of NH$_4$VO$_3$, NaVO$_3$, V$_2$O$_5$, V(C$_5$H$_7$O$_2$)$_3$, (NH$_4$)$_6$Mo$_7$O$_{24}$, and (NH$_4$)$_6$Mo$_7$O$_{24}$.4H$_2$O, wherein at least one selected from the group consisting of NH$_4$VO$_3$ and (NH$_4$)$_6$Mo$_7$O$_{24}$ is preferred.

The mixture may include the main catalyst precursor and the cocatalyst precursor such that the molar ratio of the main catalyst to the cocatalyst is 40:1 to 3:1, and preferably 15:1 to 5:1.

If the above molar ratio is satisfied, the dispersibility of the main catalyst may be remarkably improved. In addition, when the catalyst is supported, the acid point of the surface of the support is controlled by using the cocatalyst to effectively support the main catalyst in a well dispersed form.

The mixture may further include an organic acid that serves to inhibit precipitation of the main catalyst precursor and the cocatalyst precursor and control the surface charge of the support by adjusting the pH of the solution.

The organic acid may be at least one selected from the group consisting of citric acid, tartaric acid, fumaric acid, malic acid, acetic acid, butyric acid, palmitic acid and oxalic acid, wherein citric acid is preferred.

The mixture may include the organic acid and the cocatalyst precursor in a weight ratio of 1:0.2 to 1:2, and preferably include 1:0.5 to 1:1.5.

When the above-mentioned range is satisfied, after supporting, fine powder production due to precipitation of the main catalyst and the cocatalyst may be suppressed, and as a result, there is an advantage that a transparent mixture in a solution state including the main catalyst and the cocatalyst is prepared. If precipitation occurs in the mixture in a solution state, the main catalyst and the cocatalyst may not be uniformly coated on the support, and thus, a heterogeneous supported catalyst may be prepared. In addition, the heterogeneous supported catalyst may generate a lot of fine powder during growth of carbon nanotubes, which may cause difficulty during the preparing process of carbon nanotubes.

A method for preparing carbon nanotubes according to an embodiment of the present invention may further include an aging step after step 2.

The aging may be carried out for 1 to 60 minutes, preferably 10 to 50 minutes.

When the above conditions are satisfied, the main catalyst precursor and the cocatalyst precursor may be sufficiently supported on the support. In addition, bubbles which are present in the support may be removed as much as possible, such that the main catalyst precursor and the cocatalyst precursor may be sufficiently supported to the fine pores inside the support.

Step 3

Subsequently, the active carrier is dried through multi-stage drying including vacuum drying.

The multi-stage drying may mean that a drying process including vacuum drying is performed two or more times. Specifically, the multi-stage drying may mean including atmospheric pressure drying and vacuum drying, or including two or more times of vacuum drying only.

By performing the vacuum drying, not only the main catalyst precursor present in the active support, that is, the coordination compound of the main catalyst is easily decomposed, but also the main catalyst precursor may be converted into the main catalyst oxide having a very small and uniform average particle diameter. In addition, the main catalyst derived from the main catalyst oxide is present in a very small and uniform average particle diameter in the supported catalyst, and carbon nanotube unit cells grown from the main catalyst has a very small average diameter, so that the amount present per unit area is remarkably increased. If such carbon nanotubes are applied to a conductive material dispersion, the conductivity of the conductive material dispersion may be significantly improved.

In addition, since the main catalyst precursor is easily decomposed by the vacuum drying, the productivity of the supported catalyst may be improved.

The vacuum drying may be carried out at 175 to 300° C., and preferably at 180 to 280° C.

When the above conditions are satisfied, the main catalyst precursor, that is, the coordination compound of the main catalyst may be easily decomposed to form the main catalyst oxide, and the energy consumption may be minimized.

The vacuum drying may be carried out at 1 to 200 mbar, and preferably at 1 to 100 mbar.

When the above conditions are satisfied, the main catalyst precursor, that is, the coordination compound of the main catalyst is suddenly decomposed and discharged, so that the main catalyst oxide may be more easily formed under vacuum conditions, and the energy consumption may be minimized.

The vacuum drying may be carried out for 10 minutes to 3 hours, preferably 10 minutes to 2 hours.

When the above conditions are satisfied, the main catalyst precursor may be easily decomposed and converted into the main catalyst oxide, and the energy consumption may be minimized.

Meanwhile, when the multi-stage drying includes atmospheric pressure drying and vacuum drying, the atmospheric pressure drying may be performed before the above-mentioned vacuum drying is performed, and the solvent which may exist in the active carrier may be removed by the atmospheric pressure drying.

The atmospheric pressure drying may be carried out at 80 to 160° C., and preferably at 100 to 140° C.

When the above conditions are satisfied, the solvent present in the active carrier may be sufficiently removed, and the energy consumption may be minimized.

The atmospheric pressure drying may be carried out at 900 to 1,100 mbar, and preferably at 950 to 1,050 mbar.

When the above conditions are satisfied, the solvent present in the active carrier may be sufficiently removed, and the energy consumption may be minimized.

The atmospheric pressure drying may be carried out for 1 to 12 hours, preferably 3 to 9 hours.

When the above conditions are satisfied, the solvent present in the active carrier may be sufficiently removed, and the energy consumption may be minimized.

On the other hand, when the multi-stage drying includes two or more times of vacuum drying only, the multi-stage drying may include two or more times of vacuum drying which are carried out at a different temperature, more specifically, a primary vacuum drying performed at a first temperature and a secondary vacuum drying performed at a second temperature higher than the first temperature.

The primary vacuum drying may be carried out to remove a solvent that may be present in the active carrier.

The first temperature may be 80 to 160° C., and preferably 100 to 140° C.

When the above conditions are satisfied, the solvent present in the active carrier may be sufficiently removed, and the energy consumption may be minimized.

The primary vacuum drying may be carried out for 1 to 12 hours, and preferably 3 to 9 hours.

When the above conditions are satisfied, the solvent present in the active carrier may be sufficiently removed, and the energy consumption may be minimized.

The primary vacuum drying may be carried out at 1 to 200 mbar, and preferably at 1 to 150 mbar.

When the above conditions are satisfied, the solvent present in the active carrier may be sufficiently removed, and the energy consumption may be minimized.

The description of the secondary vacuum drying is as described in the above description of the vacuum drying.

The second temperature may be 175 to 300° C., and preferably 180 to 280° C.

When the above conditions are satisfied, the main catalyst precursor, that is, the coordination compound of the main catalyst may be easily decomposed to form the main catalyst oxide, and the energy consumption may be minimized.

The secondary vacuum drying may be carried out at 1 to 200 mbar, preferably at 1 to 150 mbar, and more preferably at 1 to 100 mbar.

When the above conditions are satisfied, the main catalyst precursor, that is, the coordination compound of the main catalyst is suddenly decomposed and discharged, so that the main catalyst oxide may be more easily formed under vacuum conditions, and the energy consumption may be minimized.

The secondary vacuum drying may be carried out for 10 minutes to 3 hours, and preferably 10 minutes to 2 hours.

When the above conditions are satisfied, the main catalyst precursor may be easily decomposed and converted into the main catalyst oxide, and the energy consumption may be minimized.

Step 4

Subsequently, the dried active carrier is subjected to secondary heat treatment to prepare a supported catalyst.

When the secondary heat treatment is performed, a supported catalyst is prepared in a state in which the main catalyst and the cocatalyst are coated on the surface and the pores of the support.

The secondary heat treatment may be carried out at 600 to 800° C., and preferably at 620 to 750° C.

When the above conditions are satisfied, the supported catalyst may be prepared in a state in which the main catalyst and the promoter are uniformly coated on the surface and the pores of the support, and energy consumption may be minimized.

The secondary heat treatment may be carried out for 1 to 12 hours, and preferably 2 to 8 hours.

When the above time condition is satisfied, the supported catalyst may be prepared in a state in which the catalyst precursor is uniformly coated on the surface and the pores of the support.

Step 5

Subsequently, in the presence of the supported catalyst, a step for preparing carbon nanotubes is performed.

Particularly, carbon nanotubes may be prepared by contacting the supported catalyst with a carbon-based compound, and specifically, a chemical vapor phase synthesis method may be carried out.

The step for preparing carbon nanotubes will be described in detail. First, the supported catalyst may be introduced into a horizontal fixed bed reactor or a fluidized bed reactor. Subsequently, carbon nanotubes may be grown by the chemical vapor phase synthesis method through decomposing the gaseous carbon-based compound by injecting the gaseous carbon-based compound or the gaseous carbon-based compound and a mixed gas of a reducing gas (e.g., hydrogen) and a carrier gas (e.g., nitrogen) at above a pyrolysis temperature of the gaseous carbon-based compound or a temperature below the melting point of catalyst which is supported the supported catalyst.

Carbon nanotubes prepared by the chemical vapor phase synthesis method as described above may have high crystallinity of the graphite structure in the tube length direction and the crystal growth direction is substantially parallel to the tube axis. As a result, carbon nanotubes having a small diameter and high conductivity and strength may be prepared.

The chemical vapor synthesis method may be carried out at 600 to 800° C., and preferably at 650 to 750° C.

When the above temperature condition is satisfied, carbon nanotubes may be prepared while minimizing the generation of amorphous carbon.

As a heat source for the reaction, induction heating, radiant heat, laser, IR, microwave, plasma, surface plasmon heating and the like may be used.

In addition, the carbon-based compound may supply carbon and whatever carbon-based compound can exist in a gaseous state at a temperature of 300° C. or higher may be used without particular limitation.

The carbon-based compound may be a carbon-based compound having 6 or less of carbon atoms, and at least one selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

After growing the carbon nanotubes by the above-described reaction, a cooling process for more regularly aligning the arrangement of the carbon nanotubes may optionally be further performed. Specifically, the cooling process may be performed using natural cooling according to the removal of the heat source or a cooler.

The carbon nanotubes may be in a bundle type.

2. Carbon Nanotubes

Carbon nanotubes prepared by the preparing method according to an embodiment of the present invention include carbon nanotube units having an average diameter of 5 to 20 nm.

The carbon nanotubes preferably include carbon nanotube units having an average diameter of 8 to 15 nm.

If the above conditions are satisfied, the number of carbon nanotube units which are present per unit area is remarkably increased, so that the conductivity can be remarkably improved when applied to a conductive material dispersion.

The carbon nanotubes may have a specific surface area of 200 to 350 $m^2/g$, preferably 200 to 300 $m^2/g$, and particularly preferably 240 to 280 $m^2/g$. The specific surface area of carbon nanotubes has a strong negative correlation with the average diameter. As the average diameter of carbon nanotubes decreases, the specific surface area increases. Therefore, if the specific surface area of carbon nanotubes satisfies the above conditions, the number of carbon nanotube units which are present per unit area is remarkably increased, so that the conductivity can be remarkably improved when applied to the conductive material dispersion.

Hereinafter, embodiments of the present invention will be described in detail so that a person with ordinary skill in the art can easily practice the present invention. The present invention may, however, be embodied in different forms and should not be construed as limited to the embodiments set forth herein.

EXAMPLES

Example 1

<Preparation of Supported Catalyst>
$Al(OH)_3$ (30 g, product name: BH39-622, manufacturer: Nippon Light Metal Holdings Co., Ltd., Japan) was primarily heat-treated at 400° C. for 4 hours to prepare a support. $Co(NO_3)_2 \cdot 6H_2O$ (15.7 g) as a main catalyst precursor, $NH_4VO_3$ (0.63 g) as a cocatalyst precursor, a citric acid (0.45 g) and distilled water (20 ml) were added to prepare a catalyst precursor solution. The entire amount of the catalyst precursor solution was supported on the support (20 mg) to prepare an active carrier. The active carrier was aged while being stirred for 15 minutes in a thermostat at 80° C.

The aged active support was then primarily vacuum dried at 120° C., 100 mbar for 120 minutes. The primarily vacuum dried active carrier was secondarily vacuum dried while rotating at 200° C., 10 mbar for 30 minutes. The secondarily vacuum dried active carrier was secondarily heat-treated at 700° C. for 2 hours to prepare a supported catalyst.

<Preparation of Carbon Nanotubes>
The obtained supported catalyst (1 g) was mounted on the bottom of a quartz tube having an internal diameter of 55 mm located in the fluidized bed reactor. The inside of the fluidized bed reactor was heated at a constant rate up to 660° C. in a nitrogen atmosphere, and then maintained, and synthesized for 90 hours while flowing nitrogen gas and ethylene gas in a volume ratio of 3:1 at 2.1 l/min to prepare 21 g of carbon nanotubes.

Example 2

The preparation of nanotubes in Example 2 was performed under all the same conditions as those in Example 1 except that $Co(NO_3)_2 \cdot 6H_2O$ (14.13 g) as the main catalyst precursor, $NH_4VO_3$ (0.85 g) as the cocatalyst precursor, $(NH_4)_6Mo_7O_{24}$ (0.255 g), citric acid (0.61 g) and distilled water (20 ml) were added to prepare a catalyst precursor solution.

Example 3

The supported catalyst and carbon nanotubes were prepared in the same manner as in Example 1 except that the primary vacuum dried active carrier was secondary vacuum dried while rotating at 175° C., 50 mbar for 1 hour.

Example 4

The supported catalyst and carbon nanotubes were prepared in the same manner as in Example 1 except that the primarily vacuum dried active carrier was secondarily vacuum dried while rotating at 300° C., 10 mbar for 30 minutes.

Example 5

The supported catalyst and carbon nanotubes were prepared in the same manner as in Example 1 except that the primarily vacuum dried active carrier was secondarily vacuum dried while rotating at 200° C., 50 mbar for 30 minutes.

Example 6

The supported catalyst and carbon nanotubes were prepared in the same manner as in Example 1 except that the primarily vacuum dried active support was secondarily vacuum dried while rotating at 170° C., 10 mbar for 30 minutes.

Comparative Example 1

The supported catalyst and carbon nanotubes were prepared in the same manner as in Example 1 except that the primarily vacuum dried active carrier was not subjected to secondary vacuum drying but dried at atmospheric pressure at 200° C. for 2 hours.

Comparative Example 2

The supported catalyst and carbon nanotubes were prepared in the same manner as in Example 1 except that the primarily vacuum dried active carrier was not subjected to secondary vacuum drying but dried at atmospheric pressure at 200° C. for 2 hours with the vessel lid being closed.

Experimental Example 1

Physical properties of the supported catalysts prepared in Examples 1 and 2 and Comparative Example 2 were measured by the methods described below, and the results are shown in FIG. 1 and Table 1 below.
① XRD pattern and catalyst crystallinity: XRD pattern and catalyst crystallinity were measured under the following conditions.
Bruker AXS D4 Endeavor XRD (voltage: 40 kV, current: 40 mA)
Cu Kα radiation (wavelength: 1.54 Å)
LynxEye position sensitive detector (3.7° slit)
Referring to FIG. 1, it was confirmed that the maximum diffraction peak intensity in Example 1 and Example 2 was obtained at 2θ value=25° to 30°, whereas the maximum diffraction peak in Comparative Example 2 was obtained at 35° to 40°. In addition, it was seen that the pattern of the peak in Example 1 and Example 2 and the pattern of the peak in Comparative Example 2 are generally different from each other.

From such results, it was confirmed that the supported catalysts in Examples 1 and 2 and the supported catalysts in Comparative Example 2 had different physical properties.

On the other hand, since the value in Example 1 appears almost the same as in Example 2, the lines overlap and do not appear clearly on the graph.

Experimental Example 2

Figure 2:
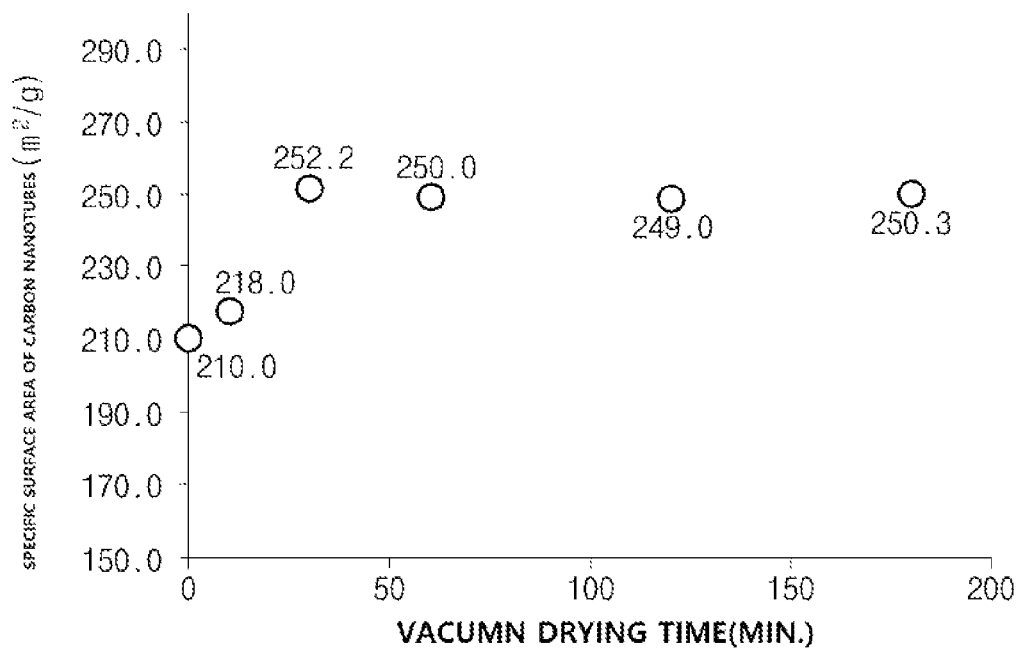
FIG. 2 is a graph showing a change in specific surface area of carbon nanotubes according to vacuum drying time when preparing a supported catalyst in Example 2 while varying the vacuum drying time.

FIG. 2 shows a change in specific surface area of carbon nanotubes according to vacuum drying time when preparing a supported catalyst in Example 2 while varying the vacuum drying time.

Referring to FIG. 2, it was seen that when the vacuum drying time is 30 minutes or less, as the vacuum drying time elapses, the specific surface area of the carbon nanotubes increases which are prepared as the supported catalyst. In addition, since the decomposition of the main catalyst precursor starts from the vacuum drying time of 30 minutes or more, it was confirmed that the specific surface area of the carbon nanotubes was maintained relatively constant.

Experimental Example 3

Physical properties of the carbon nanotubes of Examples and Comparative Examples were measured by the methods described below, and the results are shown in Table 2 below.

② Secondary structure shape was observed using a scanning electron microscope.
③ Average diameter (nm) of carbon nanotube unit was measured using SEM and BET.
④ Specific surface area ($m^2/g$) was measured by BET method using BELSORP-mini II (product name, manufacturer: BEL Japan, Inc.).

TABLE 1

| Division | Catalyst crystallinity ($I_{37°}/I_{72°}$) | Secondary structure shape | Average diameter of carbon nanotube unit | Specific surface area |
|---|---|---|---|---|
| Example 1 | 3.4 | Bundle type | 8.6 | 256 |
| Example 2 | 3.5 | Bundle type | 8.4 | 254 |
| Example 3 | 4.3 | Bundle type | 10.2 | 244 |
| Example 4 | 3.1 | Bundle type | 8.0 | 262 |
| Example 5 | 3.6 | Bundle type | 8.8 | 252 |
| Example 6 | 5.2 | Bundle type | 15.5 | 223 |
| Comparative Example 1 | 8.5 | Bundle + Entangled type | 18.4 | 205.7 |
| Comparative Example 2 | 11.5 | Bundle + Entangled type | 20.4 | 185 |

Referring to Table 1, it was confirmed that compared to the carbon nanotubes in Comparative Examples 1 and 2, the carbon nanotubes in Examples 1 to 6 in which the supported catalysts have lower crystallinity the secondary structure shape is the bundle type, and the units have smaller average diameters were prepared. However, in Comparative Examples 1 and 2, which were not subjected to vacuum drying when preparing the supported catalysts, it was confirmed that the supported catalysts have large crystallinity, and thus, the carbon nanotubes having a mixed state of a Bundle type and an Entangled type, and of which the units have a large average diameter were prepared.

Experimental Example 4

2 wt % of carbon nanotubes in Example 1 and Comparative Example 1, 97.6 wt % of N-methyl-2-pyrrolidone (NMP), and 0.4 wt % of polyvinylpyrrolidone (PVP) were introduced into a high pressure homogenizer (product name: Panda, manufacturer: GEA) and treated at 1,500 bar for 30 minutes to prepare a conductive material dispersion.

Viscosity of the conductive material dispersion was measured at 12 rpm, 25° C. using a viscometer (model name: DV2T Viscometer, manufacturer: Brookfield, Pin No: 64), the results are shown in Table 2 below.

In addition, electrode slurry including 0.5 wt % of a conductive material dispersion, 98 wt % of $LiNi_{0.6}Mn_{0.2}Co_{0.2}O_2$, and 1.5 wt % of polyvinylidene fluoride (PVDF) was prepared, followed by drying at 150° C. for 6 hours to prepare powder.

Powder resistance was measured at 64 MPa with 5 g of powder using MCP-PD51 (model name, manufacturer: Mitsubishi Chemical).

TABLE 2

| Division | Viscosity of conductive material dispersion (cP) | Powder Resistance (Ω-cm) |
|---|---|---|
| Example 1 | 12,000 | 48 |
| Comparative Example 1 | 8,500 | 125 |

As shown in Table 2, the conductive material dispersion in Example 1 was higher in viscosity than the conductive material dispersion in Comparative Example 1. These results are inferred from the facts that the carbon nanotubes in Example 1 have the smaller unit diameter, the larger specific surface area, and the greater number of units contained per unit mass of the powder, compared to the carbon nanotubes in Comparative Example 1. In addition, it was confirmed that the powder in Example 1 using the carbon nanotubes is significantly lower in resistance compared to the powder in Comparative Example 1 because the electrical networking is well made.

The invention claimed is:

1. A method for preparing carbon nanotubes, the method comprising:
    preparing a support comprising AlO(OH) by primary heat treatment of $Al(OH)_3$;
    preparing an active carrier by supporting a mixture including a main catalyst precursor and a cocatalyst precursor on the support;
    drying the active carrier through multi-stage drying including vacuum drying, wherein the multi-stage drying comprises primary drying which is carried out at 80 to 160° C. and secondary drying which is carried out at 175 to 300° C.;
    preparing a supported catalyst by secondary heat treatment of the dried active carrier; and
    preparing carbon nanotubes in the presence of the supported catalyst;
    wherein the primary drying is carried out such that solvent present is removed from the active carrier,
    and wherein the secondary drying is carried out such that a coordination compound of the main catalyst is decomposed and discharged.

2. The method of claim 1, wherein the multi-stage drying comprises atmospheric pressure drying and vacuum drying.

3. The method of claim 2, wherein the atmospheric pressure drying is carried out at 80 to 160° C.

4. The method of claim 1, wherein the vacuum drying is carried out at 175 to 300° C.

5. The method of claim 1, wherein the vacuum drying is carried out at 1 to 200 mbar.

6. The method of claim 1, wherein the vacuum drying is carried out for 10 minutes to 3 hours.

7. The method of claim 1, wherein the multi-stage drying comprises primary vacuum drying which is carried out at 80 to 160° C. and secondary vacuum drying which is carried out at 175 to 300° C.

8. The method of claim 1, wherein the primary heat treatment is carried out at 100 to 500° C.

9. The method of claim 1, wherein the secondary heat treatment is carried out at 600 to 800° C.

10. The method of claim 1, wherein the main catalyst precursor is at least one selected from the group consisting of $Co(NO_3)_2$, $Co(NO_3)_2 \cdot 6H_2O$, $Co_2(CO)_8$, $Co_2(CO)_6[HC{-}C(C(CH_3)_3)]$, $Co(CH_3CO_2)_2$, $Fe(NO_3)_3$, $Fe(NO_3)_2 \cdot nH_2O$, $Fe(CH_3CO_2)_2$, $Ni(NO_3)_2$, $Ni(NO_3)_2 \cdot 6H_2O$, $Mn(NO_3)_2$, $Mn(NO_3)_2 \cdot 6H_2O$, $Mn(CH_3CO_2)_2 \cdot n(H_2O)$, and $Mn(CO)_5Br$.

11. The method of claim 1, wherein the cocatalyst precursor is at least one selected from the group consisting of $NH_4VO_3$, $NaVO_3$, $V_2O_5$, $V(C_5H_7O_2)_3$, $(NH_4)_6Mo_7O_{24}$, and $(NH_4)_6Mo_7O_{24} \cdot 4H_2O$.

12. The method of claim 1, wherein the carbon nanotubes are in a bundle type.

* * * * *